(12) United States Patent
Drumm

(10) Patent No.: US 8,904,783 B2
(45) Date of Patent: Dec. 9, 2014

(54) PRESSURE MEDIUM CONTAINER FOR A HYDRAULIC MOTOR VEHICLE BRAKE SYSTEM AND METHOD FOR FILLING

(75) Inventor: Stefan Drumm, Saulheim (DE)

(73) Assignee: Continental Teves AG & Co. oHG (DE)

( * ) Notice: Subject to any disclaimer, the term of this patent is extended or adjusted under 35 U.S.C. 154(b) by 0 days.

(21) Appl. No.: 14/007,015

(22) PCT Filed: Mar. 22, 2012

(86) PCT No.: PCT/EP2012/055150
§ 371 (c)(1),
(2), (4) Date: Feb. 10, 2014

(87) PCT Pub. No.: WO2012/127014
PCT Pub. Date: Sep. 27, 2012

(65) Prior Publication Data
US 2014/0150876 A1 Jun. 5, 2014

(30) Foreign Application Priority Data

Mar. 24, 2011 (DE) .......... 10 2011 006 014
Jan. 13, 2012 (DE) .......... 10 2012 200 515

(51) Int. Cl.
*F15B 7/10* (2006.01)
*B60T 17/06* (2006.01)
*B60T 11/26* (2006.01)

(52) U.S. Cl.
CPC *B60T 11/26* (2013.01); *B60T 17/06* (2013.01)
USPC .......................................... 60/592

(58) Field of Classification Search
CPC ....... B60T 17/225; B60T 11/26; B60T 11/10; B60T 11/101

USPC ........... 60/533, 534, 585, 592, 558; 123/506, 123/509
See application file for complete search history.

(56) References Cited

U.S. PATENT DOCUMENTS 3,542,055 A * 11/1970 Belart ........................... 137/255
3,572,850 A * 3/1971 Schultz ....................... 303/84.2
(Continued)

FOREIGN PATENT DOCUMENTS

| DE | 10 2006 040 327 | 3/2008 |
| EP | 1 894 831 | 8/2007 |

(Continued)

OTHER PUBLICATIONS

International Search Report corresponding to PCT/EP2012/055150 dated Aug. 13, 2012.

(Continued)

*Primary Examiner* — John Rivell
*Assistant Examiner* — Angelisa Hicks
(74) *Attorney, Agent, or Firm* — RatnerPrestia

(57) ABSTRACT

The invention relates to a pressure medium container for a hydraulic motor vehicle brake system, having a housing, a filler opening, a closure element and at least one hydraulic connection to the hydraulic pressure medium supply of the motor vehicle brake system. The problem of the present invention consists in reliably managing a fluctuating pressure medium filling level while nevertheless providing a container of minimal overall size and simplifying motor vehicle maintenance. The proposed solution is to provide a structurally predetermined defined volume reservoir for receiving a pressure medium, which can be rendered hydraulically effective by arranging the closure element on the filler opening.

13 Claims, 4 Drawing Sheets

(56) References Cited

U.S. PATENT DOCUMENTS

| | | | | |
|---|---|---|---|---|
| 4,168,613 A | * | 9/1979 | Nakagawa et al. | 60/562 |
| 4,181,147 A | * | 1/1980 | Fujii et al. | 137/572 |
| 4,337,792 A | * | 7/1982 | Nomura | 137/558 |
| 4,414,810 A | * | 11/1983 | Reinartz et al. | 60/535 |
| 4,909,131 A | | 3/1990 | Nix et al. | |
| 5,188,204 A | * | 2/1993 | Arrowsmith et al. | 192/3.58 |
| 5,347,813 A | * | 9/1994 | Yanagi et al. | 60/585 |
| 2008/0053758 A1 | | 3/2008 | Ruckh et al. | |

FOREIGN PATENT DOCUMENTS

| | | |
|---|---|---|
| GB | 1019945 | 2/1966 |
| WO | WO 87/03850 | 7/1987 |

OTHER PUBLICATIONS

German Search Report corresponding to DE 10 2012 204 665.8 dated Jan. 1, 2013.

* cited by examiner

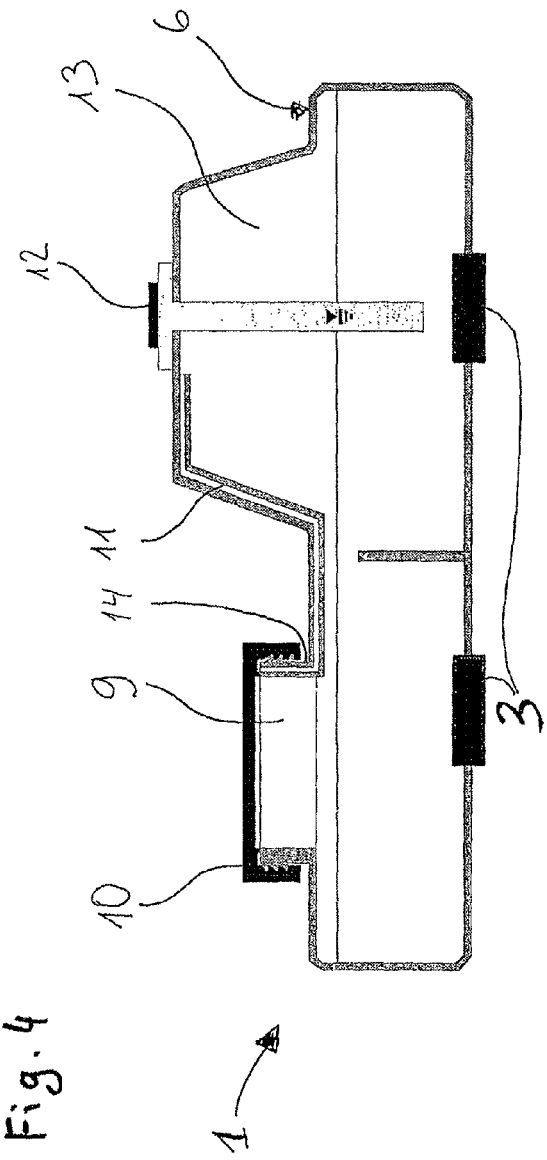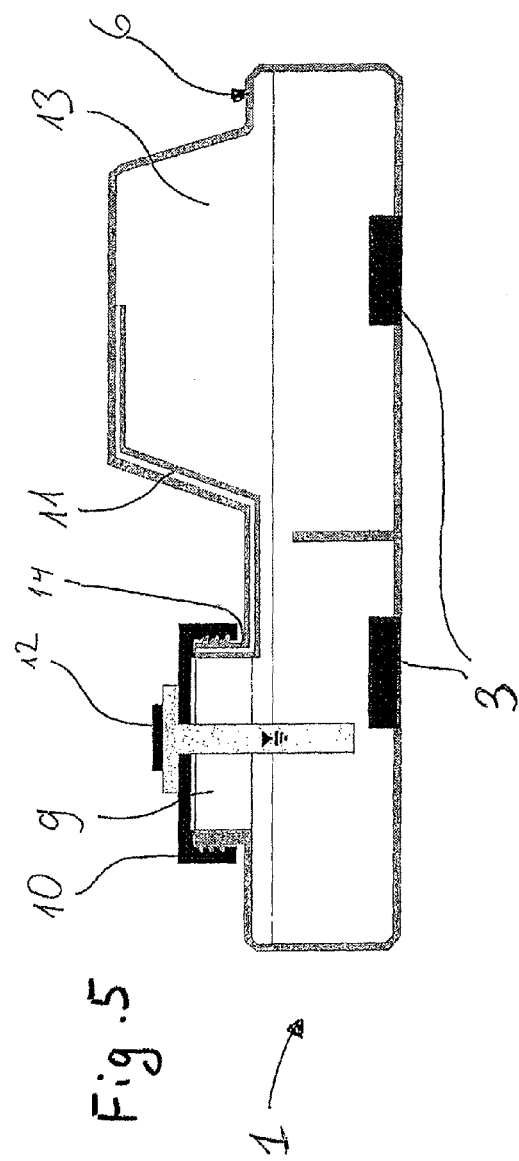

PRESSURE MEDIUM CONTAINER FOR A HYDRAULIC MOTOR VEHICLE BRAKE SYSTEM AND METHOD FOR FILLING

CROSS REFERENCE TO RELATED APPLICATIONS

This application is the U.S. National Phase Application of PCT/EP2012/055150, filed Mar. 22, 2012, which claims priority to German Patent Application No. 10 2011 006 014.6, filed Mar. 24, 2011, and German Patent Application No. 10 2012 200 515.3, filed Jan. 13, 2012, the contents of such applications being incorporated by reference herein.

FIELD OF THE INVENTION

The invention relates to a pressure medium container for a hydraulic motor vehicle brake system, having a housing, having a filler opening, having a closure element and having at least one hydraulic connection to the hydraulic pressure medium supply of the motor vehicle brake system.

BACKGROUND OF THE INVENTION

The purposes of pressure medium containers of the type in question (containers for short) are many and various and consist primarily in serving as a receiving reservoir for a fluctuating pressure medium filling level, which can be caused by unavoidable system processes, such as slopping of the pressure medium and by a variable filling level in the brake system (elasticity, brake lining wear process and brake lining replacement process, lining wear compensation process, hydraulic control processes in the electronic brake system). While a pressure medium reservoir with a holding capacity of particularly large dimensions does have functional advantages in the case of large fluctuations in filling level, this generally conflicts with the requirement for a reduced installation space and the rest of the requirement profile (costs etc.) on modern motor vehicles. Consequently, a receiving reservoir for brake fluid is in principle made as small as possible to match the minimum requirement, allowing for an emergency operation reservoir, in order to fully satisfy the requirement profile set. In addition, there is a desire for a simple and automated way of introducing pressure medium under a vacuum in a motor vehicle brake system in a reliable process at the end of the line at a motor vehicle manufacturer. For maintenance operations, it should be possible to change the pressure medium easily and in a reliable process in a specialist workshop. For this purpose, the general practice is to provide a filler opening which can be closed reversibly by means of a closure element and which can accept a coupling piece of a vacuum filling device for filling purposes. Generally, the pressure medium container is assigned an electronic filling level indicator. This serves to indicate to a vehicle driver during operation of the motor vehicle when a pressure medium filling level in the container falls below a minimum permissible pressure medium filling level.

Known pressure medium containers have at least one venting device for atmospheric pressure equalization with the surrounding atmosphere in order to ensure a current atmospheric pressure within the container at all times. A deviation in the pressure within the container from the current atmospheric pressure can lead to unwanted functional impairments of the hydraulic brake system, e.g. rubbing brakes, reduced braking force or contamination with foreign matter.

Moreover, pressure medium containers are generally designed in such a way that an upper edge of the filling opening assumes a horizontal position when the pressure medium container is introduced into its envisaged installation position in the motor vehicle.

Checking of the regulation of a pressure medium quantity, e.g. by replenishment or removal by suction during maintenance work, is generally performed manually, with visual filling level markings (min/max) for the attention of the operative being provided on the pressure medium container.

It has been found that certain, possibly interlinked, boundary conditions can lead to an impermissibly high pressure medium filling level. These include maintenance operations carried out incorrectly, for example, which can cause overfilling because, for example, a maximum marking has not been correctly observed during replenishment of the pressure medium or when changing the pressure medium. Brake lining changes which have been carried out and which, as a rule, require resetting of wheel brake cylinders, can likewise cause this problem unless excess pressure medium has been sucked out of the container. Electronic control operations or a transfer of pressure medium quantities held in other parts of the brake system, e.g. from an actuator, can likewise cause a rising pressure medium liquid level in the pressure medium container, at least for a brief period, and this can lead to an unintended escape of pressure medium.

SUMMARY OF THE INVENTION

Therefore an aspect of the invention provides a pressure medium container which, given the requirement profile defined above, makes it possible reliably to manage a fluctuating pressure medium filling level while avoiding the disadvantages of the prior art and which nevertheless has a reduced overall size and simplifies motor vehicle maintenance.

Together with the characterizing features of independent patent claim 1, this is achieved essentially by the fact that the pressure medium container has a volume reservoir for receiving pressure medium which is volumetrically structurally predetermined and which cannot be filled with pressure medium through the filler opening during pressure medium filling or pressure medium replenishment operations, i.e. is divided off hydraulically, and wherein said volume reservoir can be placed in a fillable state or rendered hydraulically effective by arranging the closure element in a fluidtight manner on the filler opening.

The invention has the significant advantage that a compensating volume reservoir is guaranteed by being divided off during the filling process and that overfilling with pressure medium is excluded at low cost and with little installation space in a way which is purely structurally determined, i.e. automatically, thus making it possible to manage a fluctuating filling level easily and reliably.

A pressure medium container according to an aspect of the invention advantageously has a volume reservoir which is arranged above an upper edge of a filler opening (filler opening upper edge) in the installation position in the motor vehicle. It is thereby possible to make particularly effective use of the available installation space and to keep the assembly process simple.

As an advantageous development of the invention, the defined volume reservoir can be designed as an integrated molded portion of a housing top shell in a divided design, or can be designed as an integrated feature on the closure element for the filler opening in an integrated design. In this context, a mushroom- or prismatic-column design arranged at right angles to the filler opening is appropriate.

In another advantageous embodiment of the invention, the closure element does not have any means for pressure equalization in the case of the divided design. The closure element is simply arranged in a sealed manner, in particular a hermetically sealed manner, with respect to the filler opening.

The volume reservoir is furthermore advantageously dimensioned in such a way that the volumetric capacity thereof is sufficient to reliably absorb all operation-related fluctuations in the pressure medium filling level in the pressure medium container, even if the pressure medium container has been filled up to an upper edge of a filler opening. The invention even makes it possible to provide filling up to the upper edge of the filling opening as the normal condition in order to provide for particularly simple leveling of the pressure medium.

In another advantageous development of the invention, it is possible to split the defined total volume of the volume reservoir into a plurality of separate reservoirs, which are arranged at different locations and positions of a pressure medium container.

In principle, it is possible, and desirable, to provide conventional pressure medium containers retrospectively with the advantages of the invention by, for example, replacing a standard conventional closure element with the closure element according to the invention having an integrated reservoir. It is self-evident that, in this case, the closure element is adapted to the main dimensions and connection dimensions of an existing container in order to replace the conventional closure element thereof.

It is furthermore possible to configure a pressure equalizing device in such a way that it is connected as an air-permeable connection at one end at a raised point within the volume reservoir and, at the other end, opens into the surrounding atmosphere at a suitable point, advantageously in a specially protected manner at an air-permeable thread for fastening the closure element. It is thereby possible to virtually exclude clogging of the pressure equalizing device. The pressure equalizing device can be made particularly reliable if it has gas-permeable means for preventing a liquid transfer or escape of foam, e.g. a membrane or a sponge.

The invention furthermore extends to a method for filling with pressure medium, wherein, in a first step, filling with pressure medium takes place substantially up to an upper edge of a filler opening, before the filler opening is closed by means of the closure element in order then to activate the defined volume reservoir or to render said reservoir hydraulically effective on completion of filling with pressure medium.

BRIEF DESCRIPTION OF THE DRAWINGS

The invention is best understood from the following detailed description when read in connection with the accompanying drawings. Included in the drawings is the following figures:

FIG. 4 shows a schematic diagram of another embodiment, of divided design, having a channel-type pressure equalizing device, and FIG. 5 shows a schematic diagram of an embodiment of divided design and having a filling level indicator arranged on the closure element.

DETAILED DESCRIPTION OF THE PREFERRED EMBODIMENTS

Figure 1:
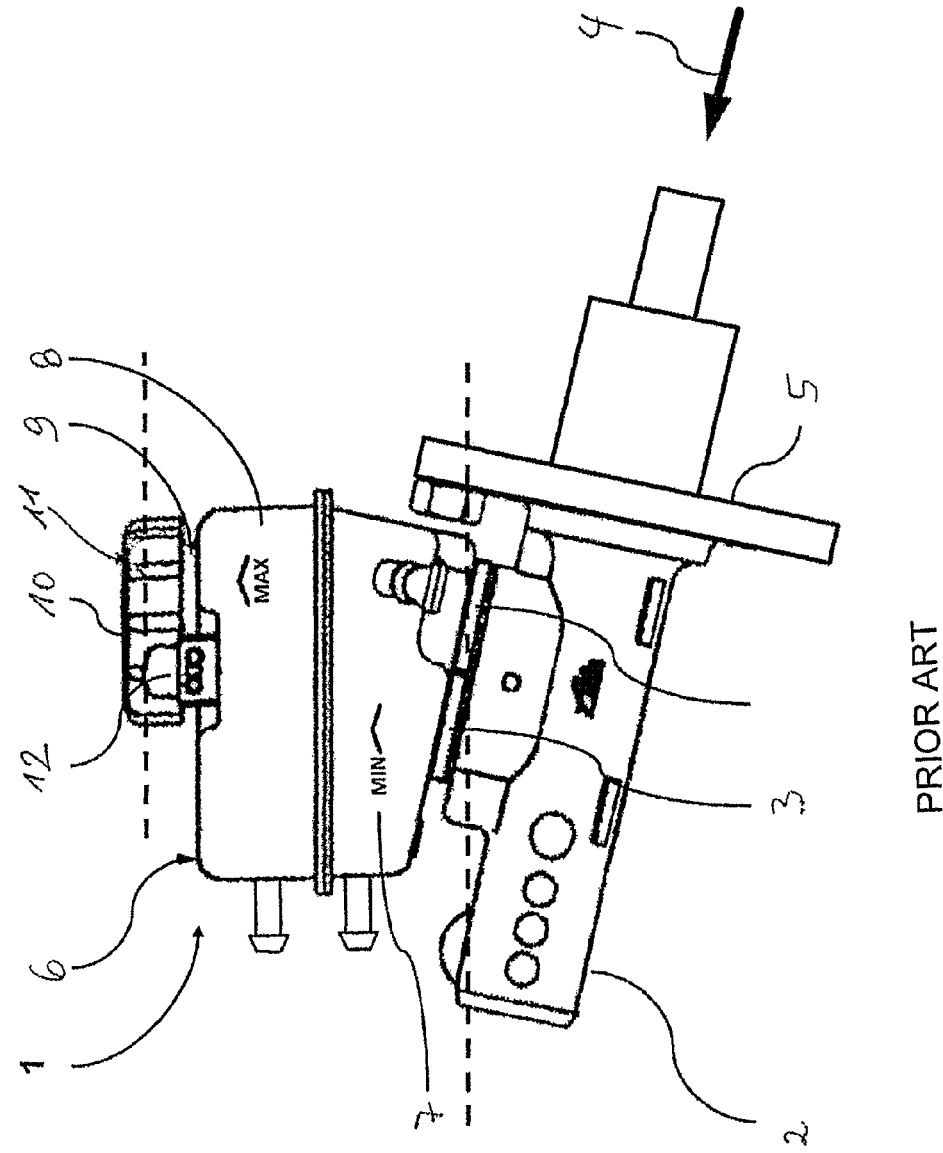
FIG. 1 shows a known master cylinder pressure medium container subassembly, largely to scale, in the installation position and in side view.

According to FIG. 1, a known subassembly has a pressure medium container 1 and a hydraulic master cylinder 2, in particular of the tandem master cylinder type, for use in a hydraulic motor vehicle brake system, wherein the pressure medium container 1 is arranged on the master cylinder 2 and is connected to the latter by at least one hydraulic connection 3. The master cylinder 2 is acted upon by an actuating unit for actuation in the direction of arrow 4. The subassembly is mounted in a fixed location on a "bulkhead" of a vehicle body by means of a fastening interface 5.

The pressure medium container 1 is formed by a housing 6, which generally has two thermoplastic half shells 7, 8 welded together, which define a top part (top shell) and a bottom part (bottom shell). The housing 6 is often semitransparent to enable the pressure medium filling level to be checked visually and corrected. For this purpose, markings—"Max" for maximum filling level and "Min" for minimum pressure medium filling level—are provided permanently on the housing 6, wherein a filling level of a correctly set braking system ready for operation and in an unactuated state and in the installation position should be between the two markings, preferably central.

The housing 6 has a filler opening 9 for introducing and replenishing pressure medium, which is closed in a reversibly releasable manner by a closure element 10. The pressure medium container is in the installation position and the upper edge of the filler opening 9 is aligned horizontally. The closure element 10 has a pressure equalizing device 11 for pneumatic pressure equalization with the surrounding atmosphere. In the simplest case, the pressure equalizing device 11 is designed as a hole through the closure element 10. One disadvantage is that pressure medium can escape from the container 1 if the pressure medium level in the container 1 rises.

The pressure medium container 1 furthermore has an electronic filling level indicator 12 in order to indicate undershooting of the minimum liquid level ("Min" marking).

Figure 2:
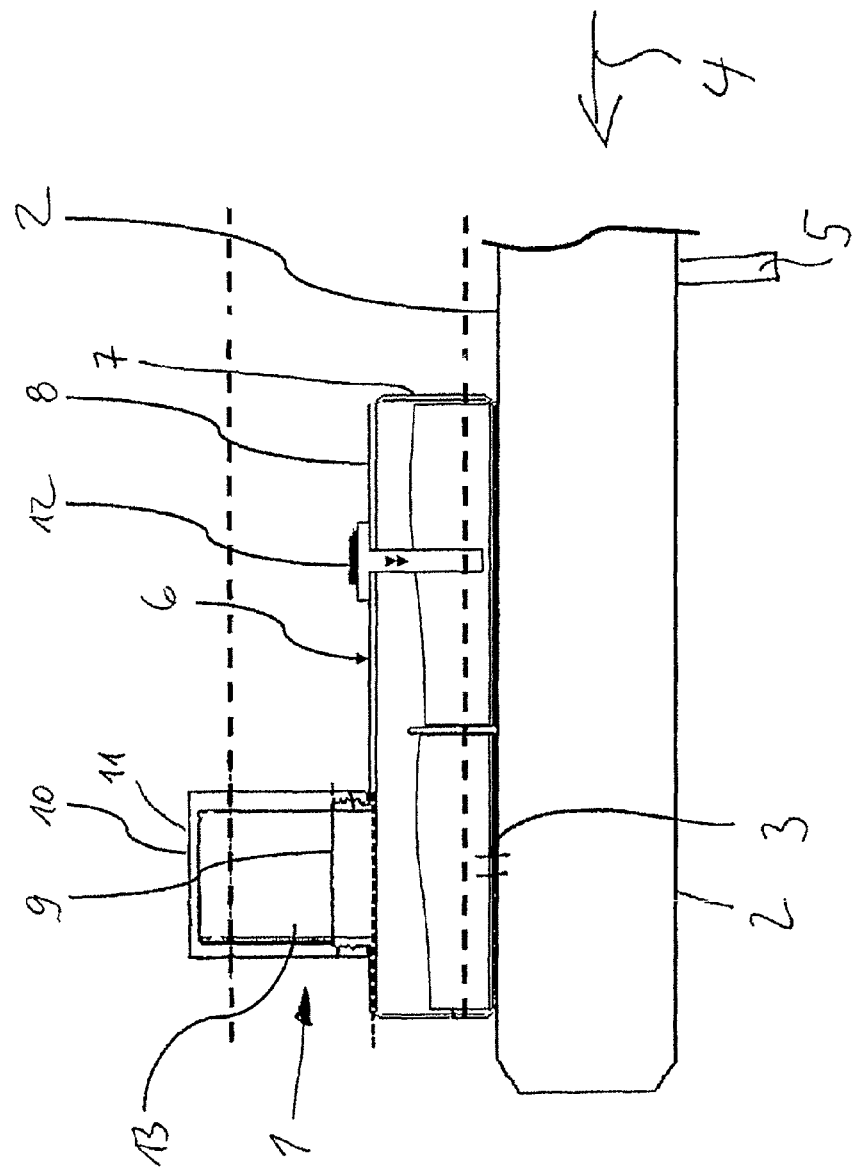
FIG. 2 shows, in section, a schematic diagram of a first, integrated embodiment having a reservoir on the closure element.

A first embodiment of a pressure medium container 1 having a defined volume reservoir 13 of integrated design is illustrated in a greatly simplified form in FIG. 2. Components which correspond to those in FIG. 1 are provided with corresponding reference numerals.

The pressure medium container 1 comprises a housing having a filler opening 9 and having a volume reservoir 13, which is provided in integrated form on the closure element 10. In this case, the closure element 10 is mounted in a reversibly releasable manner and leak-tightly on the filler opening 9. The selected leaktightness is at least liquid tightness but hermetic sealing (liquidtight and gastight) is advantageously selected.

The closure element 10 is of column-type design, so that it forms the integrated volume reservoir 13 above an upper edge of the filler opening. To form the volume reservoir 13, the closure element 10 is configured as a cylindrical tube with one open and one closed end, which adjoins the interface of the pressure medium container 1.

The volume capacity of the volume reservoir 13 is designed in such a way that all possible operating states are allowed for, even if the reservoir has been filled with pressure medium right up to the edge.

In this context, an upper edge of the filler opening limits a maximum pressure medium filling quantity that can be introduced into the pressure medium container 1 in the normal position, in the installed state, and without a closure element fitted, by virtue of the design, i.e. automatically. This is because excess pressure medium simply flows off unused and can be collected for reuse. This ensures that the volume reservoir 13 is fully available for compensation purposes after the process of introducing pressure medium and that the volume reservoir 13 is activated or made hydraulically effective only when the closure element 10 is placed on the filler opening 9.

By virtue of the pressure medium holding capacity of the volume reservoir 13, which is provided on a guaranteed basis and cannot be misused, the pressure medium container 1 according to the invention is automatically and necessarily capable of receiving a pressure medium volume as an expansion vessel, said pressure medium volume being fed from the brake system into the pressure medium container 1, even if the pressure medium container 1 has been filled up to an upper edge of the filler opening when being filled with pressure medium. Faults due to overfilling are avoided.

An electronic filling level indicator 12 is furthermore provided, being mounted on the housing 6. As an alternative, the filling level indicator 12 for all versions can be arranged on other components, e.g. on the closure element 10.

Connection between a raised point of the volume reservoir 13 and the surrounding atmosphere is achieved by means of a pressure equalizing device 11. This can be in the form of a small hole or other embodiments, e.g. in the form of relatively small stubs, apertures that can be closed by air-permeable means or a channel which is integrated into the closure element 10 and opens into an air-permeable thread for fastening the closure element 10 outside the filler opening 9, thus ensuring that the filler opening 9 continues to be sealed off relative to the closure element 10.

Figure 3:
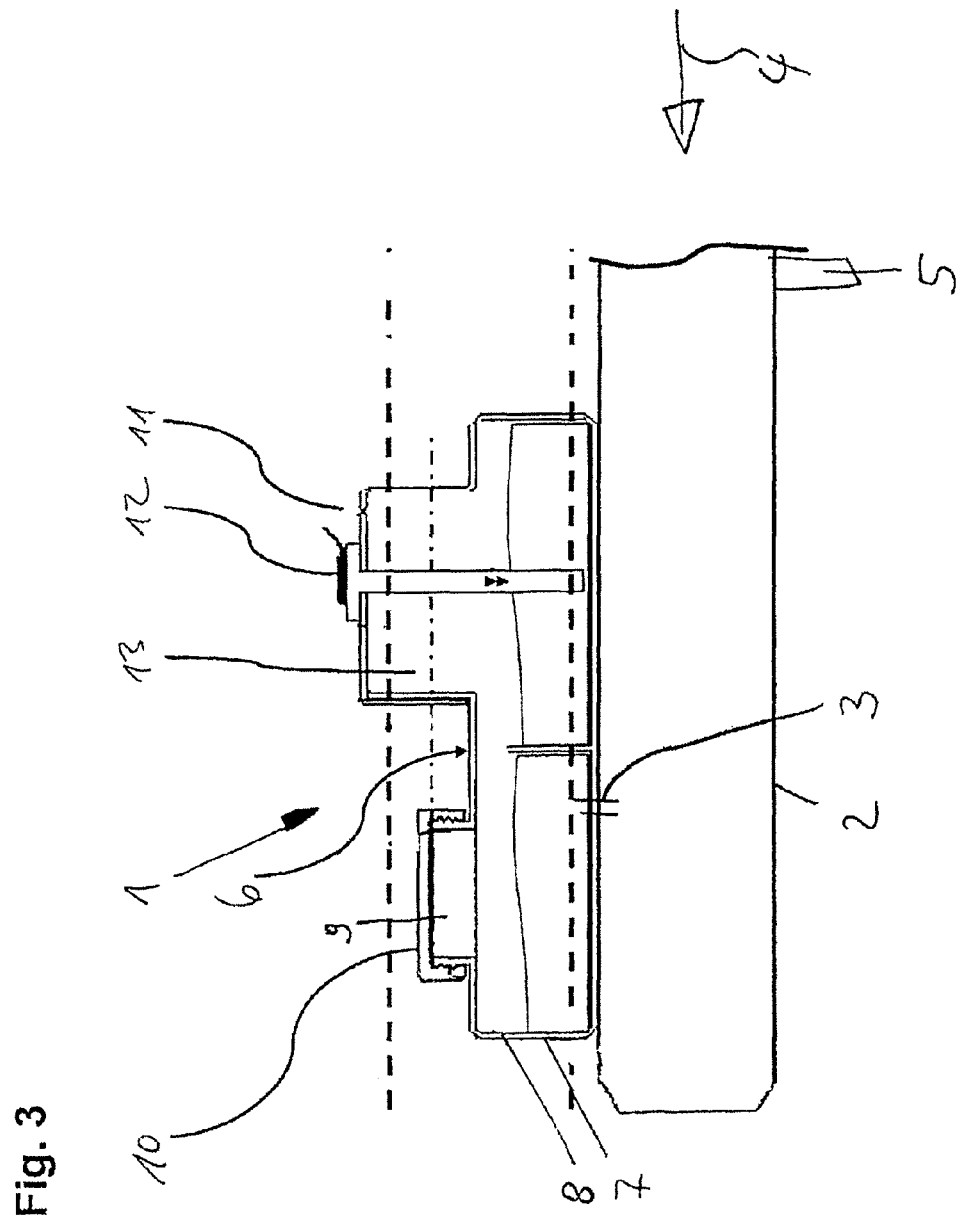
FIG. 3 shows, in section, a schematic diagram of a second embodiment, of divided design, having a reservoir on the housing top shell and having a closure element.

FIG. 3 shows another embodiment of separate, divided design. With reference to FIG. 3, only the differences with respect to the embodiment according to FIG. 2 are described below in order to avoid unnecessary repetitions. Fundamentally, closure element 10 is provided separately, i.e. divided, from the volume reservoir 13, in the embodiment according to FIG. 3, with the closure element 10 assuming only a hermetically sealed closing function for the filler opening 9, while the volume reservoir 13 is provided as integrated into the half shell 8.

A pressure equalizing device 11 with a connection to the atmosphere is positioned on the upper half shell 8 or on some other component in a raised position, e.g. in the region of the filling level indicator 12.

FIG. 4 shows another embodiment of the pressure medium container 1 having the volume reservoir 13 implemented as a divided design. Here, the pressure equalizing device 11 is designed as a channel which connects the interior of the volume reservoir 13 to an air-permeable thread for fastening the closure element 10 and opens at the thread outside the filler opening 9, thus ensuring that the filler opening 9 of filler neck 14 continues to be sealed off relative to the closure element 10. However, other embodiments of the pressure equalizing device 11 are conceivable, e.g. in the form of relatively small stubs or apertures which can be closed by air-permeable means, or channels opening out in a different way.

In the embodiment according to FIG. 5, the filling level indicator 12 provided is arranged in the closure element 10.

LIST OF REFERENCE SIGNS

1 pressure medium container
2 master cylinder
3 connection
4 arrow fastening interface
6 housing
7 half shell
8 half shell
9 filler opening closure element
11 pressure equalizing device
12 filling level indicator
13 volume reservoir
14 filler neck

The invention claimed is:

1. A pressure medium container for a hydraulic motor vehicle brake system, having a housing, having a filler opening, having a closure element and having at least one hydraulic connection to the hydraulic pressure medium supply of the motor vehicle brake system, wherein a structurally predetermined defined volume reservoir for receiving pressure medium can be rendered hydraulically effective by arranging the closure element on the filler opening, wherein the volume reservoir is provided separately from the closure element and extends spatially above an upper edge of the filler opening of the pressure medium container situated in an envisaged installation position.

2. The pressure medium container for a hydraulic motor vehicle brake system as claimed in claim 1, wherein the closure element is arranged fluidtightly and releasably on the filler opening.

3. The pressure medium container for a hydraulic motor vehicle brake system as claimed in claim 1, wherein the closure element is arranged in a hermetically sealed and releasable manner on the filler opening.

4. The pressure medium container for a hydraulic motor vehicle brake system as claimed in claim 1, wherein an interface between the closure element and the filler opening is of fluidtight and releasable design.

5. The pressure medium container for a hydraulic motor vehicle brake system as claimed in claim 1, wherein an interface between the closure element and the filler opening is of hermetically sealed and releasable design.

6. The pressure medium container for a hydraulic motor vehicle brake system as claimed in claim 1, wherein the closure element has a pressure equalizing device.

7. The pressure medium container for a hydraulic motor vehicle brake system as claimed in claim 6, wherein the pressure equalizing device allows a gas-permeable connection to a surrounding atmosphere, wherein one end of the connection is arranged inside the volume reservoir, in the immediate vicinity of the highest point thereof, wherein the highest point can be defined in the envisaged installation position of the pressure medium container.

8. The pressure medium container for a hydraulic motor vehicle brake system as claimed in claim 6, wherein the pressure equalizing device is a gas-permeable connection to a surrounding atmosphere, wherein one end of the connection is assigned to the filler neck.

9. The pressure medium container for a hydraulic motor vehicle brake system as claimed in claim 1, wherein the volume reservoir is provided as a separate molded portion of a half shell.

10. The pressure medium container for a hydraulic motor vehicle brake system as claimed in claim 9, wherein the volume reservoir is assigned a pressure equalizing device, which is provided separately from the closure element.

11. The pressure medium container for a hydraulic motor vehicle brake system as claimed in claim 10, wherein the pressure equalizing device allows a gas-permeable connection to a surrounding atmosphere, wherein one end of the connection is arranged inside the volume reservoir, in the immediate vicinity of the highest point thereof, wherein the highest point can be defined in the envisaged installation position of the pressure medium container.

12. The pressure medium container for a hydraulic motor vehicle brake system as claimed in claim 10, wherein the pressure equalizing device is a gas-permeable connection to a surrounding atmosphere, wherein one end of the connection is assigned to the filler neck.

13. A method for filling a pressure medium container for a hydraulic motor vehicle brake system, having a housing, having a filler opening, having a closure element and having at least one hydraulic connection to the hydraulic pressure medium supply of the motor vehicle brake system, wherein a structurally predetermined defined volume reservoir for receiving pressure medium can be rendered hydraulically effective by arranging the closure element on the filler opening, and wherein the volume reservoir is provided separately from the closure element and extends spatially above an upper edge of the filler opening of the pressure medium container situated in an envisaged installation position, the method comprising:
  filling the pressure medium container with pressure medium substantially up to an upper edge of the filler opening, and
  closing the filler opening in a leaktight manner by means of the closure element,
  wherein the defined volume reservoir is rendered hydraulically effective by closing the filler opening.

\* \* \* \* \*